(12) United States Patent
Isebrand et al.

(10) Patent No.: US 7,661,321 B2
(45) Date of Patent: Feb. 16, 2010

(54) FORCE SENSING CLEVIS INSERT

(75) Inventors: Scott Darrell Isebrand, Minneapolis, MN (US); James Russell Powell, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 63 days.

(21) Appl. No.: 11/903,964

(22) Filed: Sep. 25, 2007

(65) Prior Publication Data

US 2009/0078846 A1 Mar. 26, 2009

(51) Int. Cl.
*G01N 29/04* (2006.01)
(52) U.S. Cl. ............................................... 73/801
(58) Field of Classification Search ................... 73/801
See application file for complete search history.

(56) References Cited

U.S. PATENT DOCUMENTS

| | | | |
|---|---|---|---|
| 3,365,689 A | 1/1968 | Kutsay | |
| 3,600,023 A | 8/1971 | Gudde | |
| 3,695,096 A | 10/1972 | Kutsay | |
| 4,078,186 A | 3/1978 | Folen et al. | |
| 4,094,003 A | 6/1978 | Kinsner et al. | |
| 4,165,637 A * | 8/1979 | Kooman | 73/862.631 |
| 4,259,548 A | 3/1981 | Fahey et al. | |
| 4,265,124 A | 5/1981 | Lim et al. | |
| 4,318,557 A | 3/1982 | Bourne et al. | |
| 4,421,349 A | 12/1983 | Greiert, Jr. | |
| 4,613,099 A | 9/1986 | Smith et al. | |
| 4,623,813 A | 11/1986 | Naito et al. | |
| 4,679,750 A | 7/1987 | Burhans | |
| 4,709,210 A | 11/1987 | Pond | |
| 4,828,299 A | 5/1989 | Poe | |
| 4,858,475 A * | 8/1989 | Jacobson et al. | 73/862.631 |
| 5,013,091 A * | 5/1991 | Bessinger et al. | 299/1.6 |
| 5,152,559 A | 10/1992 | Henrichs | |
| 5,213,286 A | 5/1993 | Elliott et al. | |
| 5,518,206 A | 5/1996 | Arnold et al. | |
| 5,620,212 A | 4/1997 | Bourne et al. | |
| 5,808,201 A * | 9/1998 | Hugentobler | 73/643 |
| 5,959,388 A | 9/1999 | Graebner et al. | |
| 5,984,241 A | 11/1999 | Sparks | |
| 5,984,382 A | 11/1999 | Bourne et al. | |

(Continued)

FOREIGN PATENT DOCUMENTS

GB 2 267 122 A 11/1993

(Continued)

OTHER PUBLICATIONS

International Search Report and Written Opinion for PCT/US2008/069787 dated Oct. 29, 2008.

*Primary Examiner*—Lisa M Caputo
*Assistant Examiner*—Octavia Davis
(74) *Attorney, Agent, or Firm*—Edwards Angell Palmer & Dodge LLP; Joshua L. Jones; Scott D. Wofsy

(57) ABSTRACT

A sensor includes a clevis insert for reception within a first bore of a clevis. The clevis insert is configured to accommodate a latch pin. A strain sensing element is operatively associated with the clevis insert for detecting mechanical strain imparted to the clevis insert when a force acts on the clevis insert through the pin. The invention also provides a method of retrofitting a cowl latch assembly.

23 Claims, 4 Drawing Sheets

U.S. PATENT DOCUMENTS

| | | | |
|---|---|---|---|
| 6,042,156 A | 3/2000 | Jackson | |
| 6,046,657 A | 4/2000 | Alers et al. | |
| 6,144,288 A | 11/2000 | Jahn et al. | |
| 6,144,332 A | 11/2000 | Reindl et al. | |
| 6,272,916 B1 | 8/2001 | Taniguchi et al. | |
| 6,279,971 B1 | 8/2001 | Dessenberger, Jr. | |
| 6,325,428 B1 | 12/2001 | Do | |
| 6,334,588 B1 | 1/2002 | Porte | |
| 6,362,543 B1 | 3/2002 | Ellis | |
| 6,382,690 B1 | 5/2002 | Dessenberger, Jr. | |
| 6,517,027 B1 * | 2/2003 | Abruzzese | 244/129.4 |
| 6,571,638 B2 | 6/2003 | Hines et al. | |
| 6,891,286 B2 | 5/2005 | Flanagan et al. | |
| 6,933,932 B2 | 8/2005 | Knowles | |
| 7,065,459 B2 | 6/2006 | Kalinin et al. | |
| 7,066,501 B2 | 6/2006 | Meineke et al. | |
| 7,100,452 B2 | 9/2006 | Marsh | |
| 7,131,672 B2 | 11/2006 | Pratt et al. | |
| 7,165,455 B2 | 1/2007 | Magee et al. | |
| 7,392,710 B1 * | 7/2008 | Ben-Mansour et al. | 73/861.47 |
| 2004/0012212 A1 | 1/2004 | Pratt et al. | |
| 2006/0038410 A1 | 2/2006 | Pratt et al. | |
| 2006/0123913 A1 | 6/2006 | Marsh | |
| 2006/0266561 A1 * | 11/2006 | Dellac et al. | 177/136 |
| 2007/0054644 A1 | 3/2007 | Fitzgibbon et al. | |

FOREIGN PATENT DOCUMENTS

WO      WO-00/75900      12/2000

* cited by examiner

FORCE SENSING CLEVIS INSERT

BACKGROUND OF THE INVENTION

1. Field of the Invention

The present invention relates to a clevis insert for sensing force within a bore. Particularly, the present invention is directed to a force sensing clevis insert for detecting status of a latch on an aircraft.

2. Description of Related Art

A variety of devices and methods are known in the art for detecting whether an aircraft latch is in a secured state. Of such devices, many are directed to determining whether an aircraft latch for securing an engine cowl is in a secured state.

FIG. 1 shows an aircraft engine 1 with one engine cowl 2 open and one engine cowl 3 closed. Cowls 2 and 3 can be hinged open by releasing a latch 4 from a stationary pin 5. Opening the cowls allows the engines to be serviced and maintained. However, failure to re-secure the cowls after opening them can lead to malfunction of the cowls during take-off or flight. In some circumstances, the cowls can be blown off from the aircraft completely. Fortunately, the loss of an engine cowl is not generally a serious threat to an aircraft. It is nonetheless advantageous to reduce the number of cowl incidents. Typically, the onus is on ground personnel to verify that all engine cowls are secured before an aircraft pulls away from its gate. It is believed that the prevailing cause of engine cowl incidents is failure of ground crew to securely latch engine cowls prior to departure.

Efforts have been made to assist ground crews in verifying engine cowls are secured. U.S. Pat. No. 6,334,588 to Porte describes a system for securing fan cowls in which a maintenance crew can visually detect an unsecured fan cowl because edges of unsecured fan cowls protrude enough to allow for visual detection. Another visual technique for detecting unsecured cowls is described in U.S. Pat. No. 5,518,206 to Arnold et al., which describes an apparatus that extends a flag visible to ground crew when an engine cowl is unsecured.

Other efforts have been made in creating systems to inform operators whether an engine cowl is secured or not by means of sensors. U.S. Patent Application No. 2006/0038410 to Pratt et al. describes a latch having sensors to assist controlling an electrical motor, which operates to open and close a latch for a fan cowl. The sensors can also inform a controller as to the status of the latch.

Such conventional methods and systems generally have been considered satisfactory for their intended purpose. However, while visual cues make it easier to verify that an engine cowl is securely latched, these techniques still rely on the ground crew to remember to check the latches. Although solutions to this problem have been developed, such as by using sensors to detect the state of a cowl latch, as in the stress sensors in the latch mechanism disclosed in U.S. Patent Application No. 2004/0012212 to Pratt et al., there still remains a continued need in the art for a latch sensor that is more sensitive, reliable, and easier to change out for replacement. There also remains a need in the art for a system of latch detection that is inexpensive and easy to make and use, including retrofitting existing latches without substantial alterations. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a sensor having a clevis insert for reception within a first bore of a clevis. The clevis insert is configured to accommodate a latch pin. A strain sensing element is operatively associated with the clevis insert for detecting mechanical strain imparted to the clevis insert when a force acts on the clevis insert through the pin.

The clevis insert can be generally annular, "c" or "u" shaped, or any suitable shape, without departing from the spirit and scope of the invention. It is envisioned that the clevis insert can define a recess configured to receive the strain sensing element and adapted to concentrate mechanical strain on the strain sensing element. The clevis insert can include a first alignment feature proximate a periphery of the clevis insert, the first alignment feature being configured and adapted to cooperate with a corresponding second alignment feature within the first bore of the clevis to align the clevis insert. The first and second alignment features can be configured and adapted to align the strain sensing element along a load path defined by a force load when the force acts on the clevis insert. The second alignment feature within the bore can include a notch defined in a periphery of the bore. The second alignment feature can be generally cylindrical in shape. It is also envisioned that the clevis insert can be mounted on an engine cowl door.

The recess defined by the clevis insert can be configured and adapted so that when a force acts on the clevis insert, the force compresses a portion of the clevis insert proximate the strain sensing element. The sensor can further include an electrical circuit electrically coupled to the strain sensing element to facilitate measurement of strain. The strain sensing element can be a surface acoustic wave ("SAW") strain sensor configured and adapted to be excited by energy at a first radio frequency and to wirelessly transmit a second radio frequency indicative of strain experienced by the clevis insert. The sensor can further include an RF transceiver configured and adapted to transmit the first radio frequency to the SAW strain sensor, to receive the second radio frequency from the SAW strain sensor, and to transmit status information indicating the status of the latch.

The clevis insert can also include an outwardly extending flange to prevent the clevis insert from passing through the first bore. The clevis insert can further include a passage defined therein. The passage can extend from the recess of the clevis insert to an area proximate the peripheral surface of the clevis insert. The passage can extend from the recess to an edge of the clevis insert. The passage can be configured and adapted to accommodate an antenna, wire, optic fiber, or other suitable communications means extending from the strain sensing element.

The subject invention is also directed to a latch assembly including a clevis portion with a wall having a first bore extending therethrough. The latch assembly further includes an annular insert accommodated within the first bore of the wall of the clevis portion and having an aperture extending therethrough. A keeper pin extends through the aperture in the annular insert. A strain sensing element is mounted adjacent the aperture of the annular insert for detecting mechanical strain imparted to the annular insert when a force acts on the annular insert through the keeper pin.

The clevis can have a second wall having a second bore, and the keeper pin can be configured and adapted to extend through the aperture in the annular insert and the second bore in the clevis. It is envisioned that the clevis portion can be mounted on an engine cowl door. The latch assembly can further include an RF transceiver configured and adapted to transmit the first radio frequency to the SAW strain sensor, to receive the second radio frequency from the SAW strain sensor, and to transmit status information indicating the status of the latch.

The invention also includes a sensor for measuring a force load on a pin within a bore. The sensor includes an insert configured and adapted to be inserted at least partially into the bore. The insert defines a passage at least partially therethrough. The passage is configured to receive the pin. The sensor also includes a strain sensing element operably coupled to the insert. The strain sensing element is configured and adapted to detect mechanical strain on the insert when the force load acts on the insert.

In accordance with a further aspect of the invention, the strain sensing element is configured and adapted to detect a mechanical strain on the insert when the force load compresses the insert. The strain sensing element can be, for example, a SAW strain sensor configured and adapted to be excited by energy at a first radio frequency. The SAW strain sensing element can be configured and adapted to wirelessly transmit a second radio frequency indicative of strain experienced by the insert.

The subject invention also includes a sensor for detecting a force acting on a keeper pin disposed in first and second bores of a clevis. The sensor includes a clevis insert configured and adapted to fit between the first bore of a clevis and the keeper pin. A strain sensing element is operably coupled to the clevis insert. The strain sensing element is configured and adapted to detect a mechanical strain on the clevis insert when the force acts on the clevis insert.

It is envisioned that the sensor can further include an electrical circuit coupled electrically to the strain sensing element to facilitate measurement of strain. The circuit can be a Wheatstone bridge circuit, among others. The strain sensing element can be, for example, a SAW strain sensor configured and adapted to be excited by energy at a first radio frequency and to wirelessly transmit a second radio frequency indicative of strain experienced by the clevis insert. The sensor can further comprise an RF transceiver configured and adapted to transmit the first radio frequency to the SAW strain sensor, to receive the second radio frequency from the SAW strain sensor, and to transmit status information indicating the status of the latch.

The subject invention is also directed to a clevis insert having a body configured and adapted to be inserted at least partially into a bore in a latch. The insert defines a passage at least partially therethrough. The passage is configured to receive a pin of the latch. A recess is defined in the insert body. The recess is configured and adapted to receive a strain sensing element.

The subject invention is also directed to a kit for retrofitting a latch of an engine cowl of an aircraft to facilitate sensing when the latch is secured. The kit includes a clevis insert configured and adapted to be inserted at least partially into a bore of the latch. The insert defines a passage at least partially therethrough, the passage being configured and adapted to receive a pin of the latch. The kit further includes a strain sensing element configured and adapted to be operatively coupled to the clevis insert. The strain sensing element is configured and adapted to detect mechanical strain on the insert when a force load acts on the insert indicative of the engine cowl being securely latched.

In accordance with another aspect of the invention, the kit further includes an alignment pin configured and adapted to be attached inside the bore of the latch to align the clevis insert with the bore. An alignment feature can be defined in a peripheral surface of the clevis insert. The alignment feature can be configured and adapted to cooperate with the alignment pin within the bore to align the clevis insert such that the strain sensing element is located along a path defined by a force load when the force load acts on the clevis insert, indicative of the latch and engine cowl being secured.

Then invention also includes a method for retrofitting a latch assembly including the step of providing a clevis insert with a clevis insert body dimensioned for reception within a bore in a wall of a clevis. The clevis insert body has an aperture therein for receiving a latch pin. The clevis insert also includes a strain sensing element provided on the clevis insert body adjacent the aperture for detecting mechanical strain imparted to the clevis insert when a force acts thereon through the pin. The method also includes the step of enlarging an existing bore formed in a wall of the clevis. The method further includes positioning the clevis insert within the bore in the wall of the clevis. It is envisioned that the clevis can be mounted on an engine cowl door.

The subject invention further includes a method for modifying an aircraft latch to facilitate sensing whether or not the latch is secured. The method includes providing a clevis insert, inserting the clevis insert into the first bore, and inserting the pin through the pin bore and a second bore of the clevis. The clevis insert is dimensioned to fit within the first bore of the clevis of the latch. The clevis insert includes a strain sensing element operably coupled thereto, and a pin bore parallel with the first bore when the clevis insert is inserted in the first bore. The pin bore is configured and adapted to receive the pin of the latch.

The method for modifying an aircraft latch can further include the step of enlarging the first bore of the clevis to receive the clevis insert therein. The method can also include forming a first alignment feature in the first bore, and providing a second alignment feature on the clevis insert. The second alignment feature is configured to cooperate with the first alignment feature of the first bore to align the strain sensing element in the first bore. The second alignment feature can be configured and adapted to align the strain sensing element along a load path defined by an operational force load within the latch when the latch is secured. The clevis insert can include an outwardly extending flange and can be inserted until the flange contacts the clevis.

The subject invention is also directed to a method for determining if a latch for securing an engine cowl on an aircraft is secured. The latch according to the method includes at least one clevis and one pin. The method includes providing a strain sensing element operably coupled to a clevis insert, the clevis insert being disposed between the clevis and the pin. The method also includes transmitting a first signal when the strain sensing element senses a force load acting on the pin of the latch, the first signal being indicative of the engine cowl being secured. The method further includes transmitting a second signal when the strain sensing element senses relaxation of the force load acting on the pin of the latch. The second signal is indicative of the engine cowl being unsecured.

These and other features and benefits of the subject invention and manner in which it is employed will become more readily apparent to those having ordinary skill in the art from the following enabling description of the preferred embodiments of the subject invention taken in conjunction with the several drawings described below. It is to be understood that both the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

So that those skilled in the art to which the subject invention appertains will readily understand how to make and use the system of the subject invention without undue experimentation, preferred embodiments thereof will be described in detail hereinbelow with reference to certain figures, wherein.

DETAILED DESCRIPTION OF THE PREFERRED EMBODIMENT

Reference will now be made in detail to the present preferred embodiments of the invention, examples of which are illustrated in the accompanying drawings. The methods and corresponding steps of the invention will be described in conjunction with the detailed description of the system.

The devices and methods presented herein may be used for detecting the state of a latch. The present invention is particularly suited for sensing whether or not an aircraft engine cowl is latched. In accordance with the invention, a sensor for detecting a force acting on a pin disposed in the first and second bores of a clevis is provided including a clevis insert configured and adapted to fit between the first bore of the clevis and the pin. A strain sensing element is operably coupled to the clevis insert. The strain sensing element is configured and adapted to detect a mechanical strain on the clevis insert when the force acts on the clevis insert.

Figure 2:
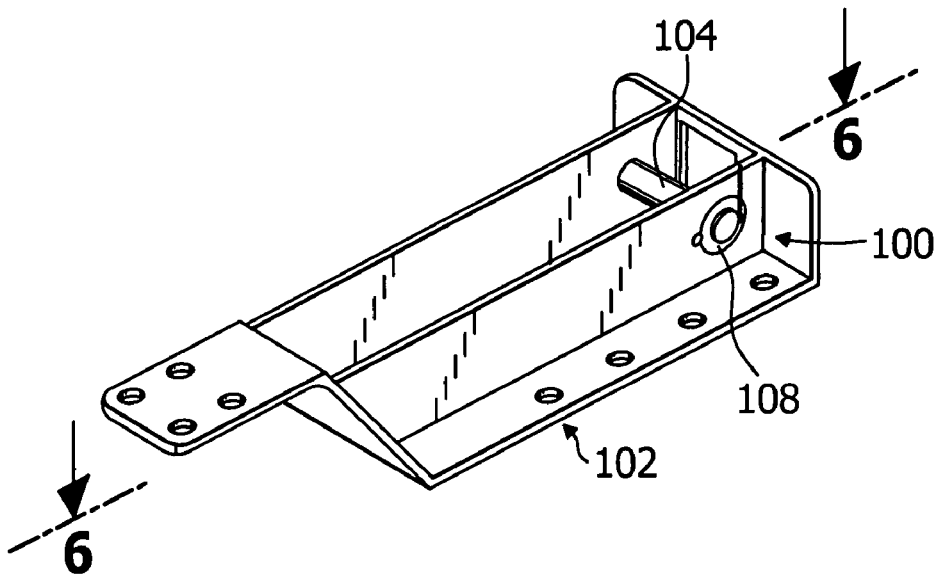
FIG. 2 is a perspective view of a first representative embodiment of a sensor in accordance with the present invention, showing the force sensing clevis insert in place within a bore of a latch clevis.

For purpose of explanation and illustration, and not limitation, a partial view of an exemplary embodiment of the sensor in accordance with the invention is shown in FIG. 2 and is designated generally by reference character 100. Other embodiments of a sensor in accordance with the invention, or aspects thereof, are provided in FIGS. 3-7, as will be described.

Figure 1:
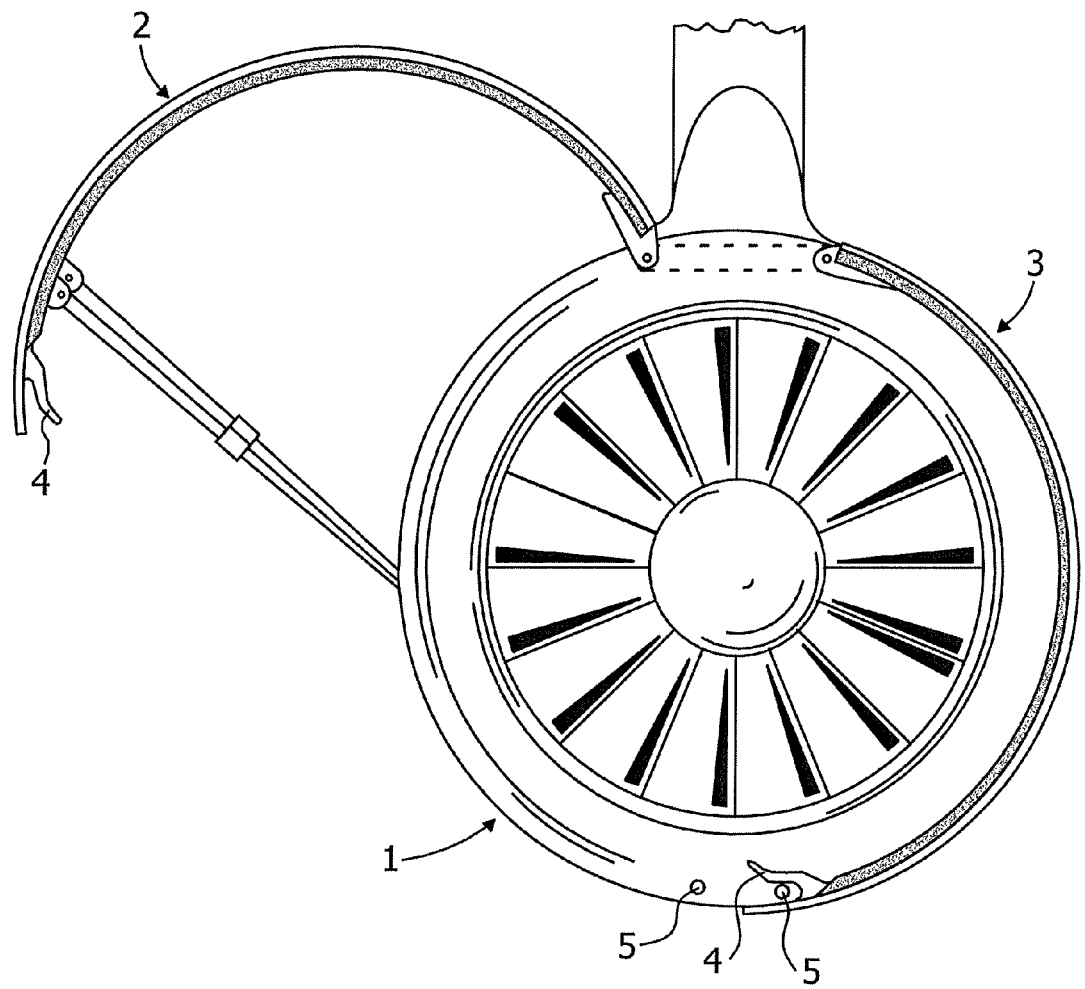
FIG. 1 is a front view of a typical aircraft engine, showing one cowl open and one cowl closed.
Figure 3:
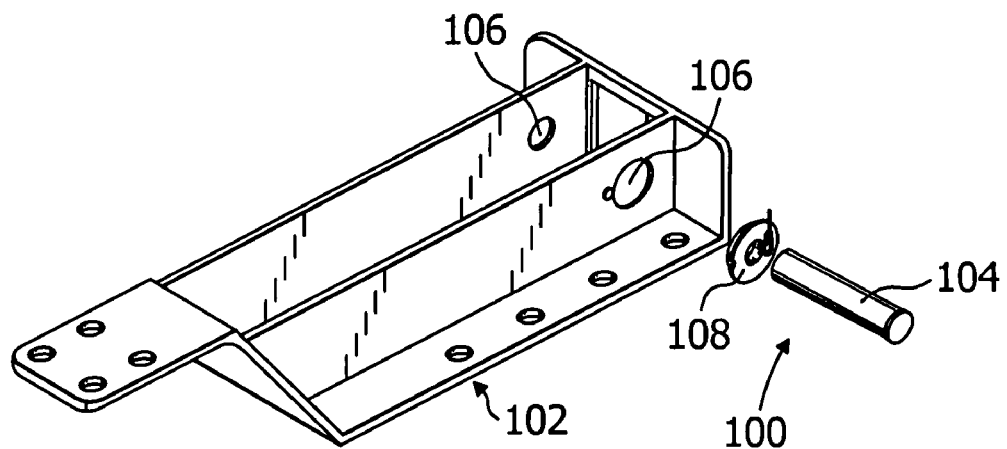
FIG. 3 is an exploded perspective view of the sensor of FIG. 2 in accordance with the present invention, showing the enlarged bore in one side of the clevis for accommodating the force sensing clevis insert.

In accordance with the invention, and as shown in FIGS. 2-3, a clevis 102 is provided having a pair of bores 106 for holding a latch pin 104. Clevis 102 and pin 104 are typical components of latches, including mechanical over-center latch devices, or other latch configurations commonly used in latching aircraft components, such as engine cowls (as shown in FIG. 1). Latches typically lock a keeper onto a pin to secure the latch in a closed position. In over-center latches, for example, the latch components must be moved through a high-stress position to be opened or closed. When closed, such latches are still stressed to some extent, albeit at a lower stress than the peak stress experienced during opening and closing the latch. This stressed state helps maintain the latch securely closed. Due to the various states of stress the latch undergoes depending on whether it is open, closed, or somewhere in between, sensing the state of stress on components within the latch can be useful in determining whether or not the latch is secured.

Pin 104 can be the pin onto which the keeper locks. However, other pins in a latch can also be suitable for use with the invention, such as pins on which the keeper pivots. Those skilled in the art will appreciate that any pin through which a force is concentrated when the latch is closed, and through which the force is relaxed when the latch is open, can be used without departing from the spirit and scope of the invention.

For purposes of illustration and not limitation, as embodied herein and as depicted in FIGS. 2-5, sensor 100 is provided with a clevis insert 108 configured and adapted to fit between pin 104 and one of the bores 106 of the clevis 102. Pin 104 fits through pin bore 103 (shown in FIG. 4) defined in insert 108. Pin 104 is also inserted through both bores 106 of clevis 102. In this configuration, pin 104 is supported at one end by a bore 106 of clevis 102, and at the other end by insert 108, as shown in FIG. 2. While only one insert 108 is depicted, a second insert 108 could also be used in the other side of clevis 102, thus supporting each end of pin 104 with an insert 108 according to the invention.

Figure 4:
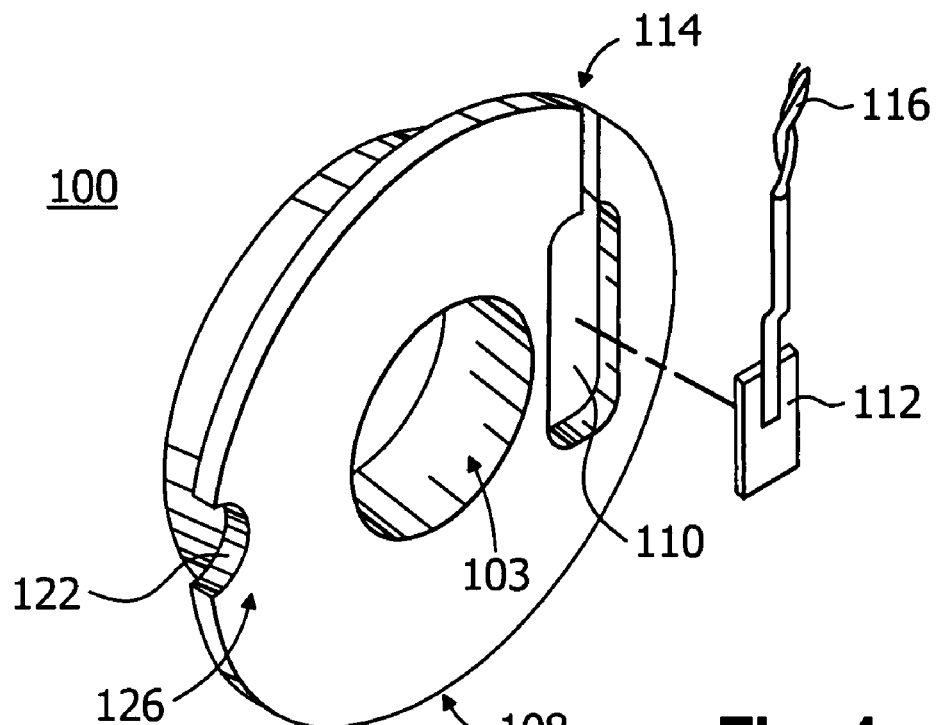
FIG. 4 is a perspective view of a first representative embodiment of a force sensing clevis insert in accordance with the present invention, showing a strain gauge and lead wire in position to be placed in the recess of the clevis insert.
Figure 5:
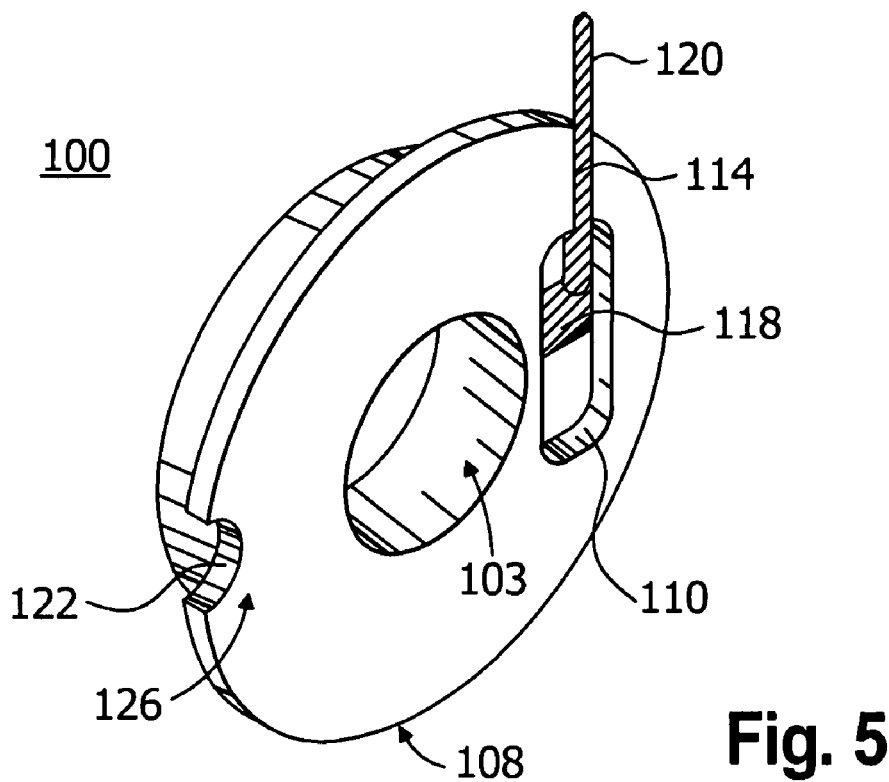
FIG. 5 is a perspective view of the force sensing clevis insert of FIG. 4 in accordance with the present invention, showing a SAW chip and antenna mounted in the recess of the clevis insert.

While insert 108 is shown and described having a generally annular or circular shape, it is possible to employ other shapes of insert. For example, insert 108 could be generally "c" or "u" shaped without departing from the spirit and scope of the invention. Moreover, while the bore 106 of insert 108 extends completely therethrough, it is also possible to use an insert with a bore that extends only partially therethrough, which would resemble an end cap for pin 104 that could hold pin 104 in clevis 102. The periphery of insert 108 has an outwardly extending flange 126, as shown in FIGS. 4-5. Flange 126 is optional. However it is advantageous, since it serves to prevent insert 108 from passing completely through bore 106 during assembly or operation. In general, those skilled in the art will readily appreciate that any suitable shape can be used for insert 108 without departing from the spirit or scope of the invention, which is not limited to any specific geometry. So long as the bore or pin accommodating feature compliments the pin, it will be encompassed within the subject invention.

When assembled into clevis 102, operational forces acting on pin 104 must also act through insert 108 in order to be resolved by the support of clevis 102. Thus the forces exerted on pin 104 and clevis 102 during opening, closing, and in the secured state of the latch will also largely act on clevis insert 108.

In further accordance with the invention, a strain sensing element is provided. As indicated in FIG. 4, strain sensing element 112 is operably coupled to the clevis insert. A recess 110 is defined in an exterior face of clevis insert 108. The recess is dimensioned to accommodate strain sensing element 112, as indicated by the connecting line shown in FIG. 4.

Strain sensing element 112 is a traditional strain gauge of the electrical resistive type. Leads 116 can be connected to electrical circuitry, including a Wheatstone Bridge, to provide measurements of strain on strain gauge 112. Properly mounted in recess 110, strain gauge 112 can provide measurements of the mechanical strains on clevis insert 108 caused by forces acting on pin 104 during operation of the latch. A passage 114 accommodates lead 116 passing from recess 110 to the periphery of clevis insert 108.

With reference now to FIG. 5, a different kind of strain sensing element is depicted. A strain sensor in the form of a surface acoustic wave ("SAW") chip 118 is shown mounted to recess 110 within clevis insert 108. An antenna 120 extends from SAW chip 118 through passage 114. It is possible that if antenna 120 does not extend beyond the edge of insert 108, passage 114 need not extend all the way to the edge of clevis insert 108. Antenna 120 enhances the ability of SAW chip 118 to send and receive RF signals, as described in detail below. As will be appreciated, antenna 120 can be of any suitable shape and may be defined within the external perimeter of clevis insert 108. For example, antenna 108 can curve about the periphery of clevis insert 108. Moreover, a portion or all of antenna 120 can protrude outwardly from the face of clevis insert 108, as desired.

SAW technology is known in the art for detecting mechanical stress/strain on a chip, such as in load sensors and pressure sensors (see e.g., U.S. Pat. No. 4,265,124 to Lim et al., U.S. Pat. No. 6,144,332 to Reindl et al., and U.S. Pat. No. 4,623,813 to Naito, each of which is incorporated by reference herein in its entirety). SAW chip 118 is advantageous because of its wireless nature. A nearby transceiver can excite SAW chip 118 with RF energy at a first frequency and SAW chip 118 will then react by sending out RF energy at a second frequency. The second frequency sent by SAW chip 118 will vary depending on the state of strain in SAW chip 118. Thus a nearby RF detector can be used to determine the strain on clevis insert 108 based on the RF frequency received from SAW chip 118, when excited. Since SAW chip 118 is wireless, assembly of sensor 100 is significantly simplified over using wired sensors. Moreover, if sensor 100 uses a SAW chip 118 and needs to be replaced, it can be changed out directly without dealing with wires, connectors, etc.

While sensor 100 is described herein in conjunction with strain gauge 112 or SAW chip 118, those skilled in the art will appreciate that any suitable strain-sensing element can be used without departing from the spirit and scope of the invention. Strain sensing crystals, such as piezoelectric sensors, optical strain sensors, or any other suitable strain sensor can be used. Regardless of what type of strain sensing element is employed, the invention can be used to determine whether a latch is secured based on the strain information provided by the strain sensing element.

This information provided by sensor 100 can be in the form of an on/off signal, such as a signal when the latch is secured, and lack of a signal when the latch is open. The information can also be provided as one signal if the latch is open, and a different signal if the latch is secured. In this manner, a signal is provided in both latch states, so that it can also be ascertained that sensor 100 is functional at all times regardless of what state the latch is in.

Moreover, the information provided by sensor 100 can be used in a variety of ways. For example, the information can be displayed on a console for ground crews to verify the latch is secured. Alternatively, such a console could be provided inside an aircraft for the flight crew, and especially in the cockpit for the pilots to ascertain the state of the latch. It is also possible that such a console could be located elsewhere, such as in an air terminal, control tower, or any other suitable location. Sensor 100 could also be used to provide data to flight control systems. For example, it is possible to configure an aircraft to disable certain flight systems in order to ground an aircraft if the latch is not secure.

The information from sensor 100 can be conveyed to such consoles or flight systems in any suitable manner. It is contemplated that the information can be conveyed through wires or wirelessly by any suitable means known in the art.

With reference now to FIGS. 4 and 5, recess 110 is an optional feature. Those skilled in the art will appreciate how to practice the invention with a strain sensing element 112/118 mounted to clevis insert 108 without any recess. However, recess 110 provides certain advantages. For example, recess 110 can enhance the overall robustness of sensor 100 by providing protective seclusion to delicate strain sensing elements 112/118. This robustness can be further enhanced by filling recess 110 with a protective material, such as resin, epoxy, or the like, after strain sensing element 112/118 is mounted. It is also possible to protect strain sensing element 112/118 (including lead 116 or antenna 120) by covering the entire face of sensor 108 with a layer of protective material after mounting sensing element 112/118 in place.

Figure 6:
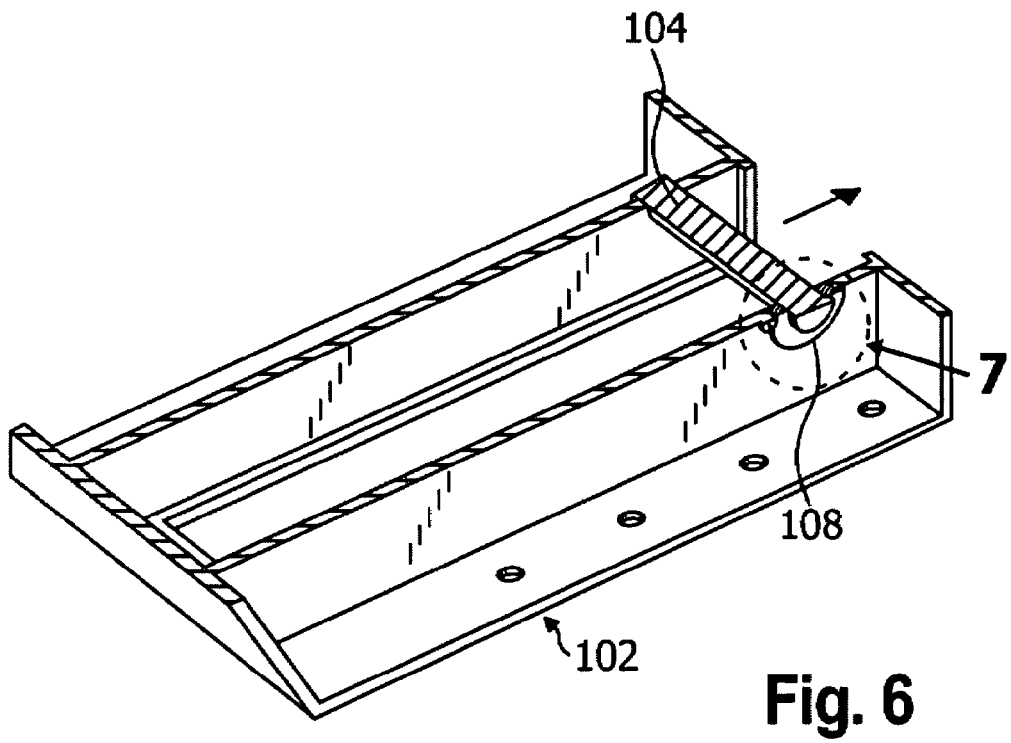
FIG. 6 is a cut-away perspective view of the sensor of FIG. 2 in accordance with the present invention, showing the cross section of the pin and force sensing clevis insert within the bore of the latch clevis.
Figure 7:
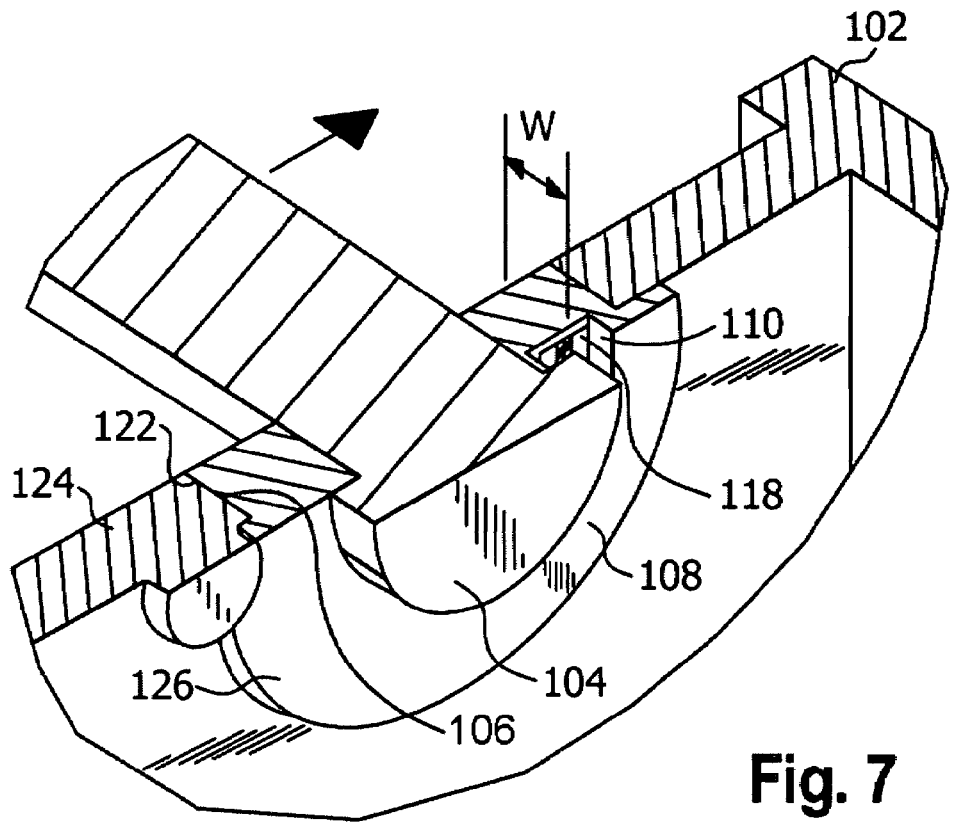
FIG. 7 is an enlarged perspective view of a portion of the sensor of FIG. 6 in accordance with the present invention, showing the area of stress concentration in the recess of the clevis insert, as well as the alignment pin maintaining the orientation of the clevis insert within the bore.

With reference now to FIGS. 6 and 7, a further advantage of recess 110 can be seen. The large arrow in FIG. 6 indicates the direction of a typical force acting on pin 104 in clevis 102 when the latch is secured. The circled area of FIG. 6 is enlarged in FIG. 7, which shows the details of the cross section of clevis insert 108. Since clevis insert 108 has a reduced cross-sectional width "W" adjacent to recess 110, mechanical strain on clevis insert 108 will be particularly concentrated in recess 110, where strain sensing element 112/118 is mounted. Thus locating strain sensing element 112/118 within recess 110 increases the sensitivity of sensor 100 to forces acting on pin 104. Those skilled in the art will appreciate that the greater the depth of recess 110, the greater the concentration of mechanical strain will be, the greater the sensitivity of strain sensing element 112/118. Moreover, while recess 110 is set into only one side of clevis insert 108, it is also possible to have a similar recess defined in the other side of clevis insert 108 to further decrease cross sectional width "W" under strain sensing element 112/118. Those skilled in the art will readily be able to further modify the sensitivity of sensor 100 by choosing a material for insert 108 with an appropriate modulus of elasticity. Suitable materials include corrosion resistant steels, titanium alloys, and aluminum alloys. Those skilled in the art will readily appreciate that there are numerous other suitable materials that can be used without departing from the spirit and scope of the invention.

In further accordance with the invention, an alignment feature is provided on the clevis insert. For purposes of illustration and not limitation, as embodied herein and as depicted in FIGS. 4, 5, and 7, clevis insert 108 is provided with a first alignment feature 122 defined in the periphery. First alignment feature is depicted as a lunate cut-out which is configured to mate with second alignment feature 124 in bore 106, as depicted in FIG. 7. Alignment feature 124 is depicted as a generally cylindrical protrusion extending inward from the periphery of bore 106. However, as will be appreciated, a protrusion of any suitable cross sectional shape may be used, as long as registration is provided between clevis insert 108 and bore 106.

Alignment features 122 and 124 cause clevis insert 108 to have a particular orientation within bore 106. As shown in FIG. 7, alignment features 122 and 124 serve to orient insert 108 so that recess 110 and strain sensing element 112/118 lie directly in the load path defined by the force acting on pin 104 when the latch is secured (indicated by the large arrow). While those skilled in the art will appreciate that alignment features are optional in accordance with the invention, they are advantageous in assuring that sensing elements 112/118 experience strong strain readings. In this orientation, the indicated force will act to compress recess 110. The recess could also be oriented differently, for example 180° from where it is shown, in which case the indicated force could act to place recess 110 at least partially in tension, without departing from the spirit and scope of the invention. Without alignment features, clevis insert 108 could be placed out of alignment initially, or could be gradually worked to revolve out of alignment through repeated latchings and unlatchings or mechanical vibrations. While it is still possible to sense strains on clevis insert 108 when out of alignment, stronger and more consistent detection of strain is possible when keeping insert 108 properly aligned.

It is possible for second alignment feature 124 to be formed integrally with clevis 102. It is also possible for second alignment feature 124 to be a separate piece from bore 106 altogether. For example, bore 106 could have a lunate notch similar to feature 122 of insert 108, and the second alignment feature could be a pin configured to be inserted into an opening defined by the notch in bore 106 and feature 122 of insert 108. Those skilled in the art will readily appreciate numerous other suitable alignment feature configurations, all of which can be practiced in accordance with the invention without limitation to the specific examples above.

In accordance with another aspect of the invention, a method is provided for determining if a latch for securing an engine cowl on an aircraft is secured. The method includes providing a strain sensing element operably coupled to a clevis insert. The clevis insert is disposed between the clevis and the pin of the latch. The method further includes transmitting a first signal when the strain sensing element senses a force load acting on the pin of the latch. The first signal is indicative of the engine cowl being secured. The method also includes transmitting a second signal when the strain sensing element senses relaxation of the force load acting on the pin of the latch. The second signal is indicative of the engine cowl being unsecured.

For purposes of illustration and not limitation, as embodied herein and as depicted in FIGS. 2-7, a strain sensing element (e.g., 112/118) is provided, mounted to a clevis insert (e.g., 108). The clevis insert is located between the clevis (e.g., 102) and the pin (e.g., 104) of a latch.

The step of transmitting a first signal is indicative of the engine cowl being secured when the strain sensing element senses a force load acting on the pin of the latch. The signal can be transmitted through wire cables, or wirelessly as discussed above. Moreover, the signal can be transmitted to a console to inform a person of the state of the latch, as described above with reference to sensor 100. The second signal is transmitted when the strain sensing element senses a relaxation of the force load acting on the pin of the latch. As described above, the advantage of having a first signal when the latch is secured and a second signal when the latch is unsecured is that whether or not the latch is secured, it is at least clear that the sensor is operational. The first and second signals can be produced by a strain gauge, SAW chip, or any other suitable strain sensing element, as described above.

In accordance with another aspect of the invention, a method is provided for modifying an aircraft latch to facilitate sensing whether or not the latch is secured. The method includes providing a clevis insert dimensioned to fit within a first bore of a clevis of the latch. The clevis insert has a strain sensing element operably coupled thereto and a pin bore parallel with the first bore when the clevis insert is inserted in the first bore. The pin bore is configured and adapted to receive a pin of the latch. The method further includes inserting the clevis insert into the first bore and inserting the pin through the pin bore and a second bore of the clevis.

For purposes of illustration and not limitation, as embodied herein and as depicted in FIGS. 1-7, the method can be used to retrofit traditional latches to include a sensor (e.g., 100) in accordance with the invention. A clevis insert (e.g., 108) including a strain sensing element (e.g., 112/118) mounted thereon is provided. The clevis insert is dimensioned to be inserted into a bore (e.g., 106) in the clevis of the latch, and to accommodate the pin (e.g., 104) of the latch through a pin bore (e.g., 103) to support the pin in the clevis when the insert and pin are inserted into the first bore of the clevis. If necessary, the bore may be enlarged in order to accommodate the clevis insert. However, if the bore is already sized to accommodate a spacer of comparable size to the clevis insert, it may not be necessary to enlarge the bore. Rather the existing spacer could simply be replaced with the clevis insert according to the invention. The clevis insert can include an outwardly extending flange (e.g., 126) so that during insertion of the insert, the flange can engage the clevis and thereby prevent the clevis insert from passing clear through the bore.

In further accordance with the invention, it is also possible to include steps of forming a first alignment feature (e.g., 124) in the first bore and providing the clevis insert with a second alignment feature (e.g., 122). The second alignment feature is configured to cooperate with the first alignment feature to align the strain sensing element in the first bore, as described above with reference to sensor 100. In particular, it is advantageous for the alignment features to align the strain sensing element along a load path defined by an operational force load within the latch when the latch is secured, after the retrofit is complete. Other components can be installed, if necessary, near the latch. Such components can include, for example, an RF transceiver for emitting and sensing RF energy in conjunction with a SAW chip in the clevis insert, or circuitry for a strain gauge in the clevis insert, as described above. The foregoing procedures show how the invention can be useful even in existing latches with relative simplicity.

In accordance with another aspect of the invention, a kit is provided for retrofitting a latch of an engine cowl of an aircraft to facilitate sensing when the latch is secured. The kit includes a clevis insert configured and adapted to be inserted at least partially into a bore of the latch. The insert defines a passage at least partially therethrough. The passage is configured to receive a pin of the latch. The kit also includes a strain sensing element configured and adapted to be operatively coupled to the clevis insert. The strain sensing element is configured and adapted to detect mechanical strain on the insert when a force load acts on the insert indicative of the engine cowl being securely latched.

For purposes of illustration and not limitation, as embodied herein and as depicted in FIGS. 1-7, the kit includes a clevis insert (e.g., 108) configured to fit in between a pin and a clevis of a latch. As described above, use of the clevis insert according to the kit of the invention may require enlarging one of the bores of the clevis insert, depending on the relative sizes of the pin, bore, and clevis insert. A strain sensing element (e.g., 112/118) is provided. The strain sensing element of the kit is the same as described above, and can be provided already mounted to the clevis insert, or separate therefrom.

In accordance with another aspect of the invention, it is possible to include an alignment pin with the kit. The alignment pin is configured and adapted to be inserted between the bore and the clevis insert to align the insert, as described above. The clevis insert can be supplied in the kit already having an alignment feature on the periphery thereof for use in conjunction with the alignment pin or other alignment features formed in the bore of the clevis. The alignment pin and/or alignment features are used to align the strain sensing element along a load path, as described above.

While the invention has been described above in the context of a clevis, particularly a clevis in a latch for an aircraft engine cowl, it will be apparent to those skilled in the art that the invention can also be used in other contexts. For example, the force sensing clevis insert can be used as a load cell in any pin and bore joint as a means of measuring force, stress, or strain on the bore and pin. Moreover, the sensor can be used in various locations throughout an aircraft to sense the closing of latches. For example, the sensor of the invention could be used to sense if an aircraft door latch is closed, without departing from the spirit and scope of the invention.

The methods and systems of the present invention, as described above and shown in the drawings, provide for a sensor with superior properties including consistent, sensitive readings, ease of use and replacement without significant modification of existing systems, and low cost. It will be apparent to those skilled in the art that various modifications and variations can be made in the devices and methods of the present invention without departing from the spirit or scope of the invention. Thus, it is intended that the present invention include modifications and variations that are within the scope of the appended claims and their equivalents.

What is claimed is:

1. A sensor comprising:
   a) a clevis insert for reception within a first bore of a clevis, the clevis insert being configured to accommodate a latch pin that extends therethrough such that the clevis insert supports the latch pin within the first bore when the clevis insert is located between the first bore of the clevis and the latch pin; and
   b) a strain sensing element operatively associated with the clevis insert for detecting mechanical strain imparted to the clevis insert when a force acts on the clevis insert through the pin, wherein the strain sensing element is located external to the latch pin between the latch pin and the first bore of the clevis when the clevis insert and latch pin are in the first bore.

2. A sensor as recited in claim 1, wherein the clevis insert defines a recess configured to receive the strain sensing element and adapted to concentrate mechanical strain on the strain sensing element.

3. A sensor as recited in claim 2, wherein the clevis insert includes a first alignment feature proximate a periphery of the clevis insert, the first alignment feature being configured and adapted to cooperate with a corresponding second alignment feature within the first bore of the clevis to align the clevis insert.

4. A sensor as recited in claim 3, wherein the first and second alignment features are configured and adapted to align the strain sensing element along a load path defined by a force load when the force acts on the clevis insert.

5. A sensor as recited in claim 4, wherein the recess defined by the clevis insert is configured and adapted so that when the force acts on the clevis insert, the force compresses a portion of the clevis insert proximate the strain sensing element.

6. A sensor as recited in claim 5, further comprising an electrical circuit electrically coupled to the strain sensing element to facilitate measurement of strain.

7. A sensor as recited in claim 1, wherein the strain sensing element is a SAW strain sensor configured and adapted to be excited by energy at a first radio frequency and to wirelessly transmit a second radio frequency indicative of strain experienced by the clevis insert.

8. A sensor as recited in claim 7, further comprising an RF transceiver operatively associated with the clevis insert and being configured and adapted to transmit the first radio frequency to the SAW strain sensor, to receive the second radio frequency from the SAW strain sensor, and to transmit status information indicating the status of the latch.

9. A sensor as recited in claim 1, wherein the clevis is mounted on an engine cowl door.

10. A latch assembly comprising:
    a) a clevis portion including a wall having a first bore extending therethrough;
    b) an annular insert accommodated within the first bore of the wall of the clevis portion and having an aperture extending therethrough;
    c) a keeper pin extending through the aperture in the annular insert; and
    d) a strain sensing element mounted adjacent the aperture of the annular insert for detecting mechanical strain imparted to the annular insert when a force acts on the annular insert through the keeper pin, wherein the strain sensing element is located external to the keeper pin between the keeper pin and the first bore of the clevis portion.

11. A latch assembly as recited in claim 10, wherein the clevis has a second wall having a second bore, and wherein the keeper pin is configured and adapted to extend through the aperture in the annular insert and the second bore in the clevis.

12. A latch assembly as recited in claim 10, wherein the annular insert defines a recess adapted to receive the strain sensing element, and wherein the recess is configured and adapted to concentrate mechanical strain on the strain sensing element.

13. A latch assembly as recited in claim 12, wherein the annular insert includes a first alignment feature proximate a periphery of the annular insert, the first alignment feature being configured and adapted to cooperate with a corresponding second alignment feature within the first bore of the clevis to align the annular insert.

14. A latch assembly as recited in claim 13, wherein the first and second alignment features are configured and adapted to align the strain sensing element along a load path defined by a force load when the force acts on the annular insert.

15. A latch assembly as recited in claim 14, wherein the second alignment feature within the bore includes a notch defined in a periphery of the bore.

16. A latch assembly as recited in claim 15, wherein the second alignment feature is generally cylindrical in shape.

17. A latch assembly as recited in claim 14, wherein the recess defined by the annular insert is configured and adapted so that when the force acts on the annular insert, the force compresses a portion of the annular insert proximate the strain sensing element.

18. A latch assembly as recited in claim 17, further comprising an electrical circuit electrically coupled to the strain sensing element to facilitate measurement of strain.

19. A latch assembly as recited in claim 10, wherein the strain sensing element is a SAW strain sensor configured and adapted to be excited by energy at a first radio frequency and to wirelessly transmit a second radio frequency indicative of strain experienced by the annular insert.

20. A latch assembly as recited in claim 19, further comprising an RF transceiver operatively associated with the annular insert and configured and adapted to transmit the first radio frequency to the SAW strain sensor, to receive the second radio frequency from the SAW strain sensor, and to transmit status information indicating the status of the latch.

21. A latch assembly as recited in claim 10, wherein the clevis portion is mounted on an engine cowl door.

22. A method of retrofitting a latch assembly comprising the steps of:
   a) providing a clevis insert having:
      i) a clevis insert body dimensioned for reception within a bore in a wall of a clevis, the clevis insert body having an aperture therein, the aperture being configured and adapted to receive a latch pin that extends therethrough such that the clevis insert body supports the latch pin within the bore when the clevis insert body is between the bore of the clevis and the latch pin; and
      ii) a strain sensing element provided on the clevis insert body adjacent the aperture so as to be located external to a latch pin when the clevis insert and latch pin are in the bore for detecting mechanical strain imparted to the clevis insert when a force acts thereon through the pin;
   b) enlarging an existing bore formed in a wall of the clevis; and
   c) positioning the clevis insert within the bore in the wall of the clevis.

23. A method of retrofitting a latch assembly as recited in claim 22, wherein the clevis is mounted on an engine cowl door.

\* \* \* \* \*